(12) United States Patent
Tompkins et al.

(10) Patent No.: US 7,719,007 B2
(45) Date of Patent: May 18, 2010

(54) FLEXIBLE ELECTROLUMINESCENT CAPACITIVE SENSOR

(75) Inventors: Michael Tompkins, Cherryville, NC (US); Alfred R. DeAngelis, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 216 days.

(21) Appl. No.: 12/150,681

(22) Filed: Apr. 30, 2008

(65) Prior Publication Data
US 2009/0273483 A1 Nov. 5, 2009

(51) Int. Cl.
H01L 23/58 (2006.01)
H01L 21/66 (2006.01)
G01R 31/26 (2006.01)

(52) U.S. Cl. ................... 257/48; 438/11; 438/18
(58) Field of Classification Search ................... 257/48, 257/232–234, E21.521–E21.531; 438/10–18
See application file for complete search history.

(56) References Cited

U.S. PATENT DOCUMENTS

| | | | |
|---|---|---|---|
| 2,866,141 A | 12/1958 | Frank et al. | 317/246 |
| 4,437,138 A | 3/1984 | Nicol | 361/283 |
| 4,644,801 A | 2/1987 | Kustanovich | 73/862.04 |
| 4,743,895 A | 5/1988 | Alexander | 340/712 |
| 4,827,763 A | 5/1989 | Bourland et al. | 73/172 |
| 5,033,291 A | 7/1991 | Podoloff et al. | 73/172 |
| 5,060,527 A | 10/1991 | Burgess | 73/862.68 |
| 5,449,002 A | 9/1995 | Goldman | 600/592 |
| 5,554,835 A | 9/1996 | Newham | 200/85 |
| 5,608,599 A | 3/1997 | Goldman | 361/283.1 |
| 5,775,332 A | 7/1998 | Goldman | 600/587 |
| 5,878,620 A | 3/1999 | Gilbert et al. | 73/172 |
| 5,923,522 A | 7/1999 | Sajna | 361/288 |
| 6,033,370 A | 3/2000 | Reinbold et al. | 600/595 |
| 6,100,478 A | 8/2000 | LaPointe et al. | 200/314 |
| 6,210,771 B1 | 4/2001 | Post et al. | 428/100 |
| 6,234,651 B1 | 5/2001 | Kodama et al. | 362/276 |
| 6,291,568 B1 | 9/2001 | Lussey | 524/413 |
| 6,333,736 B1 | 12/2001 | Sandbach | 345/178 |
| 6,369,804 B1 | 4/2002 | Sandbach | 345/173 |
| 6,389,681 B1 | 5/2002 | Rock et al. | 29/611 |
| 6,414,324 B1 * | 7/2002 | Colyott et al. | 250/484.5 |
| 6,431,005 B1 * | 8/2002 | Delaye | 73/724 |

(Continued)

FOREIGN PATENT DOCUMENTS

EP   1 211 633   6/2002

(Continued)

*Primary Examiner*—Calvin Lee
(74) *Attorney, Agent, or Firm*—Cheryl J. Brickey

(57) ABSTRACT

The flexible electroluminescent capacitive sensor system contains an electroluminescent capacitive sensor, a capacitance meter, and an electroluminescence electronic drive. The capacitive sensor contains in order a first barrier layer, a first transparent electrode layer, a phosphor layer, a second electrode layer, a flexible, resilient dielectric layer, and an electrically conductive reference layer. The capacitance meter is electrically connected to the electrically conductive reference layer and either the second electrode layer or the first electrode layer. The electroluminescence electronic drive is electrically connected to the first transparent electrode layer and the second electrode layer. The first electrode layer has a first voltage, the second electrode layer has a second voltage, and the conductive reference layer has a third voltage. The first or second electrodes may be patterned to allow for multiple sensor regions integrated into a single sensor structure.

14 Claims, 3 Drawing Sheets

U.S. PATENT DOCUMENTS

| | | | |
|---|---|---|---|
| 6,452,479 B1 | 9/2002 | Sandbach | 338/208 |
| 6,504,531 B1 | 1/2003 | Sandbach | 345/173 |
| 6,519,137 B1 | 2/2003 | Nitta et al. | 361/525 |
| 6,585,162 B2 | 7/2003 | Sandbach et al. | 235/462.44 |
| 6,637,906 B2 | 10/2003 | Knoerzer et al. | 362/84 |
| 6,639,162 B2 | 10/2003 | Sandbach et al. | 200/512 |
| 6,646,452 B2 | 11/2003 | Lester | 324/661 |
| 6,826,968 B2 | 12/2004 | Manaresi et al. | 73/862.046 |
| 6,886,864 B2 | 5/2005 | Nelson et al. | 283/83 |
| 6,999,301 B1 | 2/2006 | Sanftleben et al. | 361/312 |
| 7,098,414 B2 | 8/2006 | Caldwell | 200/310 |
| 7,208,960 B1 | 4/2007 | Deangelis et al. | 324/661 |
| 7,235,752 B1 | 6/2007 | Chen et al. | 200/310 |
| 7,276,917 B2 | 10/2007 | Deangelis et al. | 324/661 |
| 7,301,351 B2 | 11/2007 | Deangelis et al. | 324/687 |
| 7,304,201 B2 | 12/2007 | Holloway et al. | 602/41 |
| 2003/0217582 A1 | 11/2003 | Reinbold et al. | 73/12.09 |
| 2006/0131159 A1 | 6/2006 | Kaps et al. | 200/600 |
| 2006/0198080 A1 | 9/2006 | Hawes et al. | 361/311 |
| 2006/0232559 A1 | 10/2006 | Chien et al. | 345/168 |
| 2007/0188180 A1 | 8/2007 | DeAngelis et al. | 324/661 |
| 2007/0248799 A1 | 10/2007 | DeAngelis et al. | 73/718 |

FOREIGN PATENT DOCUMENTS

| | | |
|---|---|---|
| EP | 1 447 653 | 8/2004 |
| WO | 98/22836 | 5/1998 |

\* cited by examiner

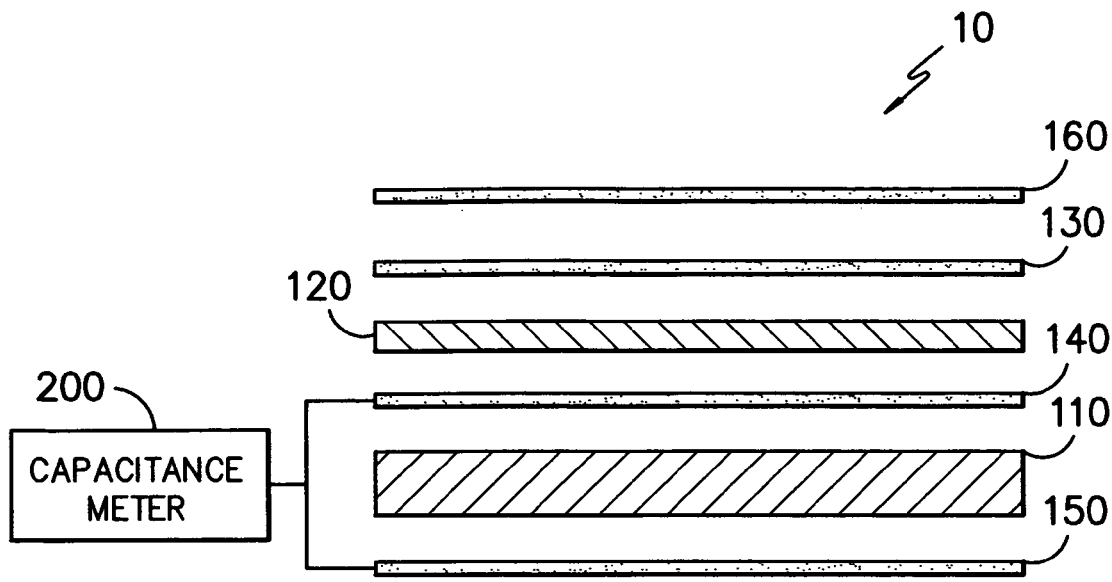
*FIG. —1A—*
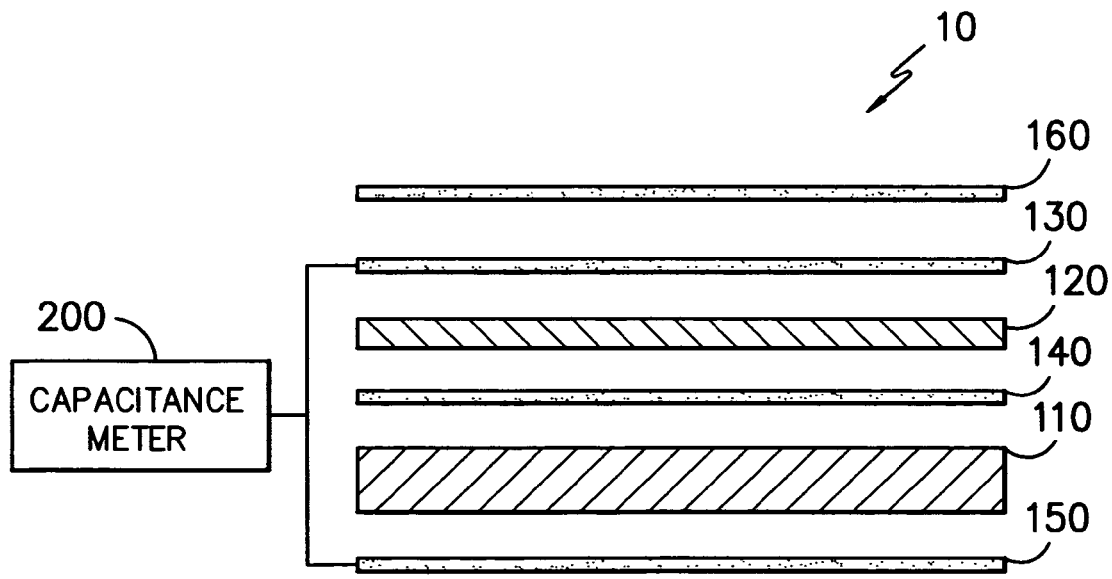
*FIG. —1B—*

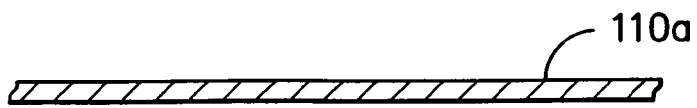
FIG. -2A-
FIG. -2B-
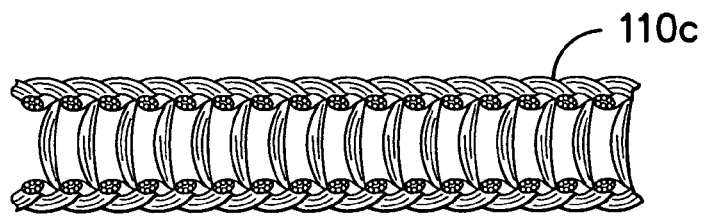
FIG. -2C-
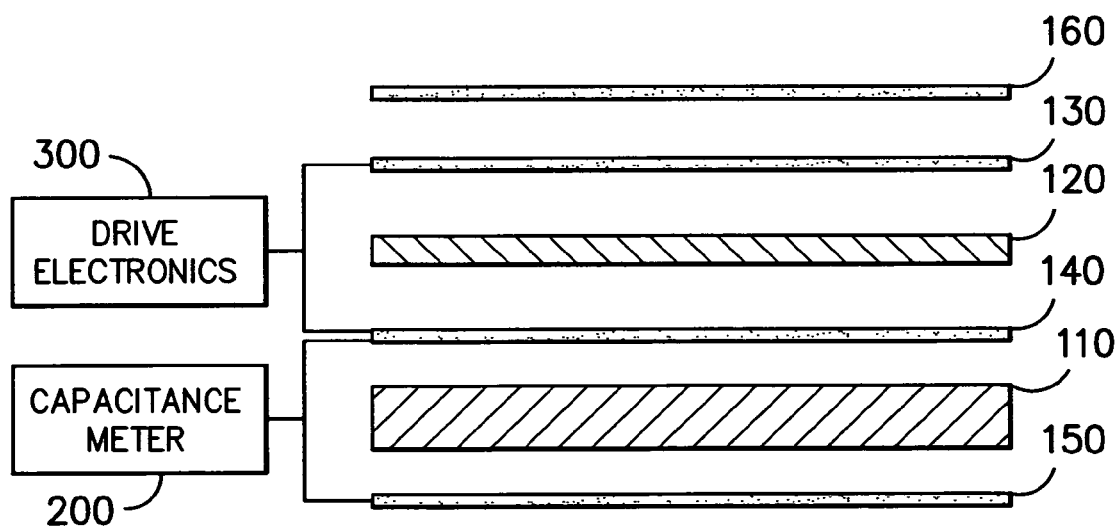
FIG. -3-

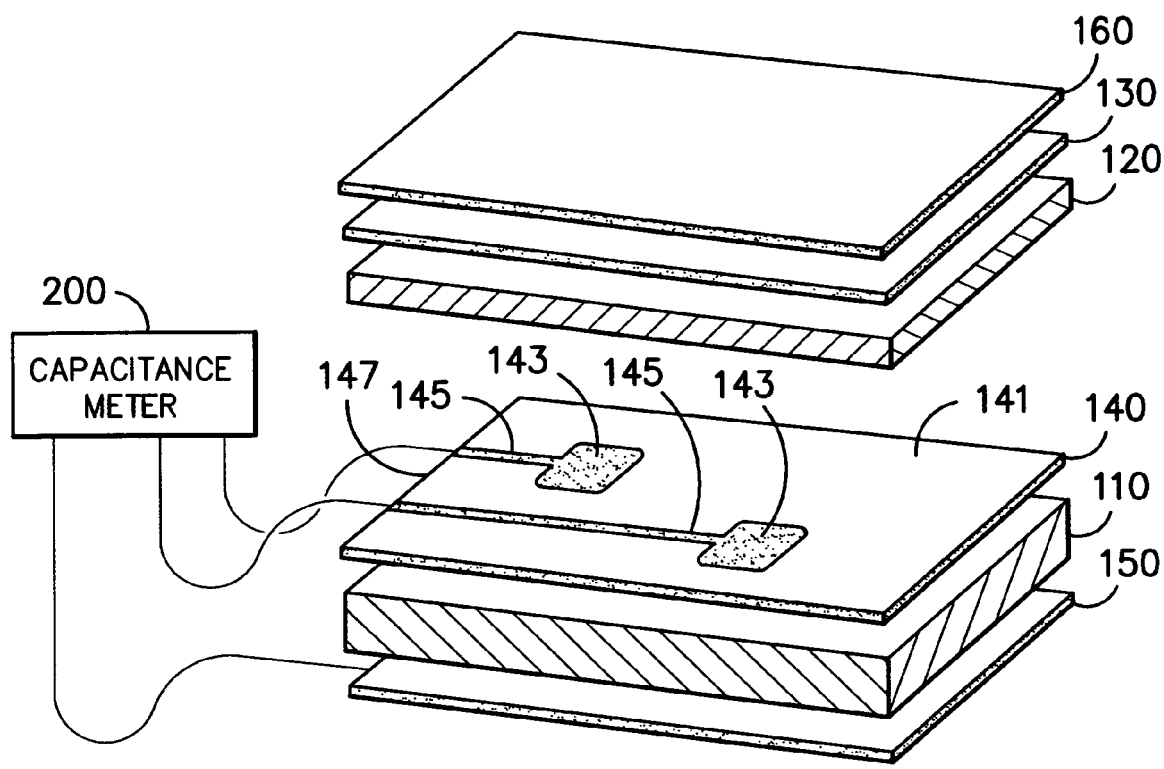
FIG. —4—

FLEXIBLE ELECTROLUMINESCENT CAPACITIVE SENSOR

FIELD OF THE INVENTION

This invention relates to an electroluminescent flexible capacitive sensor. More particularly, the invention relates to a combination of a capacitive sensor using a compressible, resilient dielectric layer and an electroluminescent lighting system.

BACKGROUND

Sensors, as the term is used here, refer to systems that react to a change in the environment. Pressure sensors react to an applied force or pressure using a variety of physical principles. Optical sensors change their optical properties under applied force. Similarly, electrically resistive, or simply resistive, sensors have an electrical resistance that changes under applied force. Piezoresistive sensors measure the change in electrical resistance of a piezoresistive material as pressure is applied.

Capacitive sensors change capacitance. This can be in response to an applied force; it can also be in response to the proximity of an object with relatively large capacitance, such as a person. Capacitive sensors can be combined with measurements of electrical resistance, as described in related U.S. application Ser. No. 11/352,107 now U.S. Pat. No. 7,208,960; U.S. application Ser. No. 11/732,150 now U.S. Pat. No. 7,276,917; U.S. application Ser. Nos. 11/732,680, 11/351, 693 now U.S. Pat. No. 7,301,351, and U.S. application Ser. No. 11/351,735, incorporated herein by reference.

Lighting for a sensor (in a car dash board or piece of clothing, for example) can be advantageously aligned with a sensor; it is sometimes desirable to locate a sensor in close proximity to and/or under a light emitting device. Because the sensors and lighting devices are often separate components, the electrical addressing required to drive them both is often complicated and costly. In all cases, aligning a light emitting device with a separately constructed sensor involves extra material and other manufacturing costs owing to the required connections and alignment of the two.

SUMMARY OF THE INVENTION

The flexible electroluminescent capacitive sensor system contains an electroluminescent capacitive sensor, a capacitance meter, and an electroluminescence electronic drive. The capacitive sensor contains in order a first barrier layer, a first transparent electrode layer, a phosphor layer, a second electrode layer, a flexible, resilient dielectric layer, and an electrically conductive reference layer. The capacitance meter is electrically connected to the electrically conductive reference layer and either the second electrode layer or the first transparent electrode layer. The electroluminescence electronic drive is electrically connected to the first transparent electrode layer and the second electrode layer. The first electrode layer has a first voltage, the second electrode layer has a second voltage, and the conductive reference layer has a third voltage.

BRIEF DESCRIPTION OF THE DRAWINGS

The accompanying drawings which are incorporated in and which constitute a part of this specification illustrate several exemplary constructions and procedures in accordance with the present invention and, together with the general description of the invention given above and the detailed description set forth below, serve to explain the principles of the invention wherein:

FIG. 1A is an illustrational side view of an electroluminescent capacitive sensor according to one embodiment of the invention.

FIG. 1B is an illustrational side view of an electroluminescent capacitive sensor according to a second embodiment of the invention.

FIGS. 2A-C is an illustrational side view of a flexible, resilient dielectric layer.

FIG. 3 is an illustrational side view of an electroluminescent capacitive sensor according to one embodiment of the invention.

FIG. 4 is an illustrational schematic view of an electroluminescent capacitive sensor according to one embodiment of the invention with detectors and traces.

To the extent possible, like elements are designated by like reference numbers throughout the various views.

DETAILED DESCRIPTION OF THE INVENTION

As depicted in FIGS. 1A and 1B, the flexible electroluminescent capacitive sensor 10 contains in order a first transparent barrier layer 160, a first transparent electrode layer 130, a phosphor layer 120, a second electrode layer 140, a flexible, resilient dielectric layer 110, and an electrically conductive reference layer 150. A capacitance meter 200 is connected to the second electrode layer 140 (in FIG. 1A) or the first electrode layer 130 (in FIG. 1B) and the electrically conductive reference layer 150. The capacitance meter 200 monitors the capacitive sensor 10 to determine whether there has been a change in capacitance and the extent of that change.

The flexible electroluminescent capacitive sensor 10 experiences a change in capacitance upon the application of force sufficient to compress the sensor. The amount of applied force, up to a point, is related to the extent of the change in capacitance. In an alternate embodiment, the resistance is also measured to determine the location of user interaction on the sensor. Having a compressible dielectric layer 110, the capacitance of the sensor 10 varies inversely with the compression of dielectric layer 110. A force applied to the sensor 10 will compress dielectric layer 110 thus increasing the capacitance between the second electrode layer 140 (or the first electrode layer 130) and the electrically conductive reference layer 150. When the force is removed, or merely lessened, the separation distance between second electrode layer 140 and electrically conductive reference layer 150 increases and the capacitance of capacitive sensor 10 decreases.

The capacitance meter as described above is used to measure the capacitance of the capacitive sensor 10. By connecting the capacitance meter as shown in FIG. 1A to the first transparent electrode layer 130 and the conductive reference layer 150 the capacitance meter will measure the capacitance change through the phosphor layer 120, the second electrode layer 140, and the compressible dielectric layer 110. By connecting the capacitance meter as shown in FIG. 2A to the second electrode layer 140 and the conductive reference layer 150 the capacitance meter will measure the capacitance change only through the compressible dielectric layer 110 and not through the phosphor layer 120 and the second electrode layer 140. In the configuration of FIG. 1A the additional distance and layers may lead to a smaller signal as measured by the capacitance meter 200.

The conductivity of the first transparent electrode layer 130 is limited by the conductivity of existing transparent conductive materials. The lower conductivity of the first transparent electrode layer 130 relative to the second electrode layer 140 results in a smaller signal as measured by the capacitance meter 200. Signal strength is maximized by connecting the capacitance meter 200 to the second electrode layer 140 and the conductive reference layer 150.

"Flexible", as related to this invention, is defined to mean pliable and capable of being substantially bent through its thinnest dimension while retaining conductivity and resilience. Preferably, each layer in the sensor is flexible. "Resilient" is defined to mean a material that essentially returns to its initial thickness after each of multiple compressions, either over a portion of the material or its entirety. "Dielectric", in this application, means a material that does not allow current to flow and supports an electric field even under the presence of a potential difference. A "film" or "foam" is defined to be a flexible material that is essentially two dimensional in extent meaning having a thickness in one dimension that is significantly smaller than its length or width. Foams include void spaces in a significant portion of their interior and are thus usually highly compressible. Films are defined to have few or no void spaces.

The dielectric layer 110 is a flexible, resilient layer, film, or fabric. The resilience of the dielectric layer 110 is important for repeated use and durability and the flexibility is important so that the sensor may be used in applications that require flexibility, such as fitting around a molded dashboard, or on clothing as part of a smart fabric. Preferably, dielectric layer 110 is capable of bending to a radius of curvature ranging from 20 millimeters (mm) to 5 mm, preferably to a range of 10 mm to 4 mm, and more preferably to a range of 5 mm to 1 mm.

In one embodiment of the invention shown in FIG. 2A, the dielectric layer 110 is a thin, flexible, resilient film 110a that has a thickness of less than 250 micrometers, preferably between 8 and 250 micrometers, and for some applications, between 8 and 50 micrometers. This thin film 110a is essentially free of voids (which can be filled with air or another gas), meaning that the film does not contain foam. The thin film 110a may be a silicone film, such as 7 mil (approximately 175 micrometers) thick Duraflex PT9300 film available from Deerfield Urethane of South Deerfield, Mass. Compressibility enables the capacitance of sensor to be altered by an applied force. The dielectric thin film preferably compresses by 50% when a load of between 50 and 150 bars is applied. This range enables an acceptable signal to be read by the capacitance meter.

In another embodiment shown in FIG. 2B, the dielectric layer 110 may be a flexible, resilient, and highly compressible closed or open cell foam 110b. Some foamed materials include, but are not limited to, polyurethane foams, silicone, and rubber. The dielectric foam 110b preferably compresses by 50% when a load of between 0.1 and 10 bars, more preferably 0.5 and 1.0 bars is applied. Preferably, the foam has a thickness of between about 1 and 10 millimeters.

In another embodiment of the invention shown in FIG. 2C, the dielectric layer 110 is a flexible, resilient spacer fabric 110c. "Spacer fabric" as defined in this application is a fabric that has upper and lower ground layers separated by a gap that is supported by spacing yarns or fibers. The spacer fabric 110c and other layers of fabric in the construction of the sensor may be formed of woven, knitted, non-woven fabrics, tufted materials, or the like. In some embodiments, the spacer fabric 110c is a double-cloth woven, double-needlebar knit, needled non-woven fabric, or a hi-loft nonwoven fabric in which some of the fibers are purposefully oriented in the vertical direction. The textile may be flat, or may exhibit a pile. In some embodiments, the spacer fabric 110c can have a thickness of between 1 mm and 10 cm, preferably between 1 mm and 1 cm. Such textile materials can be formed of natural or synthetic fibers, such as polyester, nylon, wool, cotton, silk, polypropylene, rayon, lyocell, poly(lactide), acrylic, and the like, including textile materials containing mixtures and combinations of such natural and synthetic fibers. The spacer fabric 110c preferably compresses by 50% when a load of between 0.07 and 1.4 bar is applied and compresses between 10 and 50% when a 0.14 bar load is applied. These ranges enable an acceptable signal to be read by the capacitance meter.

The electrical resistance across the dielectric layer 110 (from one side of dielectric layer 110 to its opposing side) is preferably $10^9$ ohms or greater. The greater the dielectric constant of the dielectric layer, the greater the capacitance of electroluminescent capacitive sensor 10. This allows the sensor to discriminate smaller signals, hence smaller applied forces, making the system more sensitive.

Referring back to FIGS. 1A and 1B, the electrically conductive reference layer 150 is on the side of the flexible resilient dielectric layer 110 opposite the second electrode layer 140. The electrically conductive reference layer 150 may be a conductive coating on the dielectric layer 110, an inherently conductive film or fabric, or an electrically conductive coating on a film or fabric which is then adhered to the dielectric layer 110. In some configurations the electrically conductive reference layer 150 is preferably continuous. In others, it may have openings in the layer if desired. Preferably, the electrically conductive reference layer 150 is flexible.

In one embodiment, the electrically conductive reference layer 150 is an electrically conductive coating onto the dielectric layer 110. This enables the sensor to be thinner and weigh less. This is important for portable applications and may also simplify assembly or reduce cost. The materials disclosed for the second electrode layer 140 may be also used for the conductive reference layer 150 (described below). In another embodiment, the electrically conductive reference layer 150 is an inherently conductive film or fabric. Some inherently conductive films and fabrics include, for example, metallized fabrics, carbon-loaded olefin films, fabrics coated with conductive polymers, fabrics constructed from flexible, conductive yarns such as stainless steel yarns and silver-coated yarns. In another embodiment, the electrically conductive reference layer 150 may be a film or fabric with an electrically conductive coating. Preferably, the film or fabric is adhered to dielectric layer 110 using a thermoplastic, thermoset, pressure sensitive or UV curable adhesive.

The electrical resistance of the conductive reference layer 150 is typically less than less than 10,000 ohms. If the resistance of the electroluminescent capacitive sensor 10 is not being used to determine the position of the user interaction, then the electrical resistance of the conductive reference layer may be as low as practical.

In some instances a flexible electroluminescent capacitive sensor 10 may comprise multiple separate regions of illumination. In one embodiment, the separate regions of illumination correspond to separate areas of conductivity of either the first transparent electrode layer 130 or the second electrode layer 140. By way of example, FIG. 4 shows multiple detectors 143 that correspond to separate areas of conductivity of second electrode layer 140 to create multiple separate regions of illumination. In this embodiment, each separate region of illumination can be used as a separate region of capacitive sensing. In an alternative embodiment, the multiple detectors and traces may be on the first transparent electrode layer 130 (not shown).

In one embodiment, both of the electrode layers 130 and 140 may be patterned with detectors and traces, where the detectors of each layer are in registration. In another embodiment, electrically conductive reference 150 may be patterned with detectors and traces, where the detectors are in registration with those of electrode layers 130 or 140. However, this approach does introduce an additional manufacturing complication to position each conductive layer such that its detectors and traces are registered with the pattern of detectors and traces of the other conductive layer(s).

In FIG. 1A the second electrode layer 140 is part of both the electroluminescent function and the capacitive sensor function of the flexible electroluminescent capacitive sensor 10. In FIG. 1B the first transparent electrode layer 130 is part of both the electroluminescent function and the capacitive sensor function of the flexible electroluminescent capacitive sensor 10. The capacitance meter 200 is connected to the second electrode layer 140 (FIG. 1A) or the first electrode layer 130 (FIG. 1B) and the electrically conductive reference layer 150 and monitors the sensor to determine whether there has been a change in capacitance and the extent of that change. Drive electronics 300 (shown in FIG. 3) are connected to the second electrode layer 140 and the first transparent electrode layer 130 in order to control when light and how much light is outputted by the phosphor layer 120. Having one layer perform both electroluminescent and capacitive sensor functions simplifies the construction, reduces cost, and reduces thickness of the sensor 10.

The second electrode layer 140 is on a first side of the dielectric layer 110, between the dielectric layer 110 and the phosphor layer 120. The second electrode layer 140 may be continuous or discontinuous. In one embodiment, the second electrode layer 140 has at least 2 detector areas and at least 2 traces connected to the detectors as shown in FIG. 4. Layer 140 and 120 are shown separated in FIG. 4 to be able to show the detectors and traces on layer 140.

As can be seen in FIG. 4, the second electrode layer 140 contains detectors 143 and traces 145. Detectors 143 are local areas of conductive material and traces 145 are continuous lines (that may be straight or curved) of conductive material running from detectors 143 to an edge 147 of the second electrode layer 140. Each detector 143 is preferably electrically connected to a separate trace 145 and electrically isolated from other detectors 143 and traces 145. Detectors 143 may also be referred to as buttons. Connections to the capacitance meter 200 can be made through a penetration connector (not shown) with separate pins for each trace 145, and other than through the capacitance meter 200 none of the detector/trace pairs are electrically connected to any other detector/trace pair. Preferably, the conductivity measured from the center of detector 143 to the point where trace 145 reaches edge 147 of the second electrode layer 140 is one megaohm or less, and more preferably between approximately zero and 10,000 ohms. However, it is sufficient that the electrical resistance of detector 143 to the end of trace 145 be less than the electrical resistance across dielectric layer 110.

In embodiments in which first transparent electrode layer 150 or electrically conductive reference layer 150 contains detectors, these will have corresponding traces individually connected to capacitance meter 200 in the same manner as described above for traces 145 on second electrode layer 140.

The second electrode layer 140 may be formed by applying conductive coatings to the dielectric layer 110 or a separate layer. The separate layer may be a fabric or film that is then applied to dielectric layer 110 by laminating in any manner known to those skilled in the art. Preferably, an adhesive is used between the layers including reactive urethane adhesives or low-melt polymeric materials. Adhesives can be applied for example by rotogravure printing, knife coating, powder application, or as a web, depending on the form of the adhesive. Preferably, the second electrode layer is gas impervious to prolong the electroluminescent function.

In one embodiment of the invention, detectors 143 and traces 145 are screen printed directly onto the dielectric layer 110 or on a film or fabric adhered to dielectric layer 110. The ink may be any conductive ink which is typically formed by blending resins or adhesives with powdered conductive materials such as, gold, silver, copper, graphite powder, carbon black, nickel or other metals or alloys. They may also be carbon-based ink, silver-based ink, or a combination of carbon-based and silver-based inks. The conductive ink may be coated on the substrate using any of a variety of methods known in the art, including but not limited to, screen printing, applying by brush, applying by roller, spraying, dipping, masking, vacuum plating, vacuum deposition or any combination of the foregoing.

Referring to FIG. 3, the phosphor layer 120 contains material that emits light when electrical energy is applied. This energy is applied by the electroluminescence electronic drive 300 between the first transparent electrode layer 130 and the second electrode layer 140. In one embodiment, the electroluminescence electronic drive delivers electricity to the phosphor layer 120 (through electrode layers 130 and 140) in response to the capacitance meter.

In embodiments comprising separate detectors, electroluminescence electronic drive 300 may have individual connections to each trace in electrode layers 130 or 140 so that the electroluminescence electronic drive 300 can electricity to the phosphor layer 120 through specific traces in the electrode layers 130 or 140 in response to the capacitance meter.

An example of a light-emitting electroluminescent (EL) material is zinc sulfide doped with copper or manganese. Those skilled in the art will be able to readily select suitable electroluminescent material, taking into consideration factors such as conditions of humidity, temperature, sun exposure, etc. in which the final article will be used, desired color of light emission, available power source, etc. The particles of light-emitting electroluminescent material may be coated, e.g., with a transparent oxide film, to improve the durability and resistance to humidity thereof. The EL material may be selected to emit the desired color, e.g., white, red, blue, green, blue-green, orange, etc. Two or more different EL materials may be used in combination to generate the desired color. The materials may be dispersed throughout a single layer, or two or more layers may be overlaid upon one another. The amount of electroluminescent material in the light-emissive element is dependent in part upon the brightness of emission that is desired and inherent brightness of the EL material. Typically the layer will contain between about 50 and about 200 parts by weight of EL material per 100 parts by weight of the matrix resin.

The first transparent electrode layer 130 is on the phosphor layer 120 on the side opposite to the second electrode layer 140. The first transparent electrode layer 130 is preferably indium tin oxide (ITO) because ITO has good conductivity and high transparency. In another embodiment, the first transparent electrode layer contains a transparent conductive polymer. In one embodiment, the transparent electrode layer 130 and/or the phosphor layer 120 are patterned. This patterning would control where on the phosphor layer 120 emits light. This embodiment makes the system energy efficient because light is only produced where on the sensor 10 it is necessary, instead of creating a flat field illumination. In one embodiment, the patterning on the first transparent electrode layer 130 and/or the phosphor layer 120 are patterned such that the pattern is in registration with the detectors 143 in the second electrode layer 140.

The first barrier layer 160 protects the first transparent electrode layer and the phosphor layer 120 from abrasion, water, and other corrosive elements. Preferably, the first barrier layer is a transparent polymeric material that provides high light transmission properties. However, portions of first barrier layer 160 may be opaque as a means of patterning the luminescent emissions. Suitable polymer materials for first barrier layer 160 include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Polycarbonate polymers have high light transmission and strength properties. Copolymers and/or mixtures of these polymers can be used. The polymeric materials used to make the first barrier layer 160 preferably have a light transmission greater than 92%. A polymeric material having an elastic modulus greater than 500 MPa is preferred.

Other layers may be applied in or on the sensor 10 such as insulating layers and decorative layers. An insulating layer may be coated, laminated, stitched, or otherwise applied to either or both of exterior surfaces of the sensor 10 or between the resilient dielectric layer and second conductive layer or reference layer. These layers may be constructed of any materials and in any manner such that the overall flexibility of the sensor remains acceptable. Usually these materials will retain the thin profile that is typical of the capacitive sensors of the invention. Possible materials for the exterior layers include textiles, leather or other hides, films, or coatings. The insulating layers may each be a composite of multiple materials and layers, and the top and bottom insulating layers need not be of the same make-up.

Decorative graphics or information, e.g., information about, or instructions for, touch sensor or the display or other device to which touch sensor is applied or connected, may be printed on an outermost insulating layer on the sensor. Typically the top surface of the sensor 10, the surface presented to the user, will include graphics to indicate the location and function of each of the detectors. The material can be chosen to provide both decorative and functional aspects. Functions of the insulating layer may include visual or tactile aesthetics, resistance to abrasion or punctures, stain repellence, protection from spills and liquids, resistance to ultraviolet degradation, etc. The bottom layer of the sensor can be made with similar materials to serve functions similar to the top layer, except that decorative or informative graphics are typically not included.

In the following description of capacitive sensor 10, the second electrode layer 140 and contained traces 145 and detectors 143 may be replaced by first transparent electrode 130 and contained traces and detectors on that layer without changing the functioning of capacitive sensor 10.

For the electroluminescent capacitive sensor 10, the capacitance meter 200 is connected to the electrically conductive reference layer 150 and the second electrode layer 140 at each trace 145 (if traces are present). The electrically conductive reference layer 150 is at a first reference voltage, the trace 145 or second electrode layer 140 is at a second voltage, where the first and second voltages preferably have a difference of at least 0.1 volts. In one embodiment, the reference voltage is held equal to earth ground or the ground of the sensor environment. This will serve to best isolate the electroluminescent capacitive sensor 10 from external interference and electrical discharges.

To monitor the change in capacitance as shown in FIG. 1A, preferably, a first voltage is applied to the conductive reference layer 110 and a second voltage is applied to the second electrode layer 140 (or traces 145 on the second electrode layer 140). In the case that there is more than one trace on the second electrode layer 140, then each trace 145 would get a separate voltage (ex. second, third, forth, fifth, etc. voltage). In the case where there is more than one trace, preferably the voltages are applied to the traces sequentially. In one embodiment, the voltages are applied sequentially and are substantially equal. Preferably, the voltages applied to the conductive reference layer are at least 0.1 volts different than the voltages applied to the trace(s), or in another embodiment, more than 1 volt different.

At the edge of the second electrode layer 140, a penetration connector (not shown) is used to make electrical contact with traces 145 (if present). The principle of operation of penetration connectors is well known in electronics. When making electrical connection with electrical conductors coated with insulation, penetration connectors are used to "bite" through the insulation to the conductor inside. Penetration connector will have teeth, which are applied to the trace 145 and to the conductive reference layer 150. In one embodiment, the traces 145 extend past the other layers to be connected to more easily. In another embodiment of the present invention having a plurality of detectors 143 and traces 145, separate teeth in the connector can contact each of the separate traces so that the meter 200 can be used to sense changes in capacitances as pressure is applied to each detector or multiple detectors. The use of penetration connector simplifies manufacture on a large scale.

The penetration connector allows connection of the electroluminescent capacitive sensor 10 to the capacitance meter 200 by connecting the meter 200 to the traces 145 (or the second electrode layer 140) and the meter 200 to the conductive reference layer 150. The capacitance meter 200 measures the voltage across dielectric layer 110 from the detectors 143 to the conductive reference layer 150 and compares that voltage to a reference voltage. If the capacitance across the dielectric layer 110 at detector 200 changes, the voltage across detector 200 also changes, and a voltage output signal is generated based on the difference between the reference voltage and the nominal voltage across detector 143. As the force applied to detector 143 is reduced, and dielectric layer 110 expands to its original dimensions, capacitance decreases.

The capacitance of detectors in this arrangement can be measured by a variety of electrical methods, two of which will be discussed here. The electrical measurements make use of the fact that the resistance of the traces does not change, only the capacitance of individual detectors. Thus, the measurable RC time constant characteristic of each detector and trace combination only changes due to changes in capacitance of the detector. One method is a voltage shift method; the other is a phase shift method.

In the first method, referred to herein as the voltage shift method, we use a series resistor connected to the trace. This method could also be used if there were no traces and the capacitance meter 200 is attached to the second electrode layer 140. In those cases, the meter would monitor the layer 140 instead of the traces and detectors. The capacitance meter 200 looks for any one of the following: (1) the time to obtain a set decline in the voltage of the trace and detector during discharge of detector 143; (2) the decline in the voltage of the trace and detector during a set time from the beginning of the discharge of detector 143; (3) the time to obtain a set increase in the voltage of the trace and detector during the charging of detector 143; or (4) the increase in the voltage of the trace and detector during a set time from the beginning of the charge of detector 143. Any one of these four quantities allows determination of the RC time constant, and hence a measurement of the change in capacitance of the detector.

In the second method, referred to herein as the phase shift method, a time-varying voltage signal is applied to the second electrode layer 140. A resistor to ground is connected to the conductive reference layer 150. The resistor is used to measure the phase shift between the applied signal and the lagging signal through the second electrode layer 140. As the lag is caused by the presence of capacitance in the circuit, a change in the lag can be used to determine the change in capacitance. The amplitudes of the original and lagging signal can be compared to yield more information about the state of the system. As is known in the art, common forms of the voltage signal include impulses, sine waves, and square waves. Preferably alternating voltage signals will have a frequency greater than 1 kHz. This method is well-suited to use in the electroluminescent capacitive sensor, since the lamp portion of the sensor requires an oscillating voltage of frequency preferably greater than 1 kHz in order to luminesce.

The digital information, the decay time constant or the phase shift, represents the continuous time variation of the resistive-capacitive properties of the network and, as such, the conditions of the detector 143. To achieve a better signal-to-noise ratio, averaging and filtering may be applied to the continuous data stream.

The time constant method and the phase shift method are prone to electromagnetic interference as well as stray capacitance. Thus, the noise content of the signals can obscure true conditions. Sampling is performed at intervals defined by settable interrupts in the microcontroller. Through sampling dictated by the Nyquist criterion, which governs sampling theory and digital reconstruction of high-frequency events, events happening at less than half the sampling frequency can be successfully captured. At the time of individual sampling, multiple samples on the order of a few microseconds each are averaged together to reduce the error introduced by the analog-to-digital converter as well as small electromagnetic effects. Sampling may occur at regular time intervals, or it may be advantageous to sample at random intervals so that the noise spectrum is not well correlated with the sampling interval.

The sampled data are then passed into either finite impulse response filters or infinite impulse response filters. These filters further reduce the effects of noise and interference on the sampled data from sources such as power lines. In this manner, a better estimate of the capacitance of the detector can be determined through a better estimate of the phase shift or time constant.

Cascading different filters permits different interpretations of the data. For example, a set of filters is used to remove or ignore long term changes to the system (e.g., gradual loss of resilience in the dielectric layer 110), thus providing a stable baseline, while other filters isolate the short term changes (i.e., pressing detector 143). The selection of different filters is a significant improvement over simple sampling and comparison to a threshold.

The capacitive sensor 10 requires calibration. Calibration is needed because baseline capacitance tends to drift over time because of environmental changes, material changes, and external electromagnetic fields. Particularly in dielectric materials made of foam, notwithstanding the use of foams with minimized creep and hysteresis, capacitance nonetheless will change in time. A sensor that can be recalibrated will always be more robust and sensitive than one that cannot.

There are three ways to calibrate sensor 10. The first way is to program calibration settings at the time of manufacture. A second method is to calibrate sensor 10 every time the system of which it is a part initializes itself, that is, upon start up. This method effectively reduces errors for some variations on large time scales. In the third method, the sensor 10 is continuously calibrated for changing conditions by filtering out extraneous electrical noise as well as disregarding the inadvertent touch or other contact.

There are commercially available electronic modules that are designed to sense capacitance and that incorporate continuous self-calibration, noise filtering, and recalibration.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flexible electroluminescent capacitive sensor system comprising an electroluminescent capacitive sensor, a capacitance meter, and an electroluminescence electronic drive, wherein the capacitive sensor comprises in order:
   a first barrier layer;
   a first transparent electrode layer;
   a phosphor layer;
   a second electrode layer;
   a flexible, resilient dielectric layer; and,
   an electrically conductive reference layer, wherein the capacitance meter is electrically connected to the electrically conductive, reference layer and either the second electrode layer or the first transparent electrode layer, wherein the electroluminescence electronic drive is electrically connected to the first transparent electrode layer and the second electrode layer, wherein the first transparent electrode layer has a first voltage, the second electrode layer has a second voltage, and the electrically conductive reference layer has a third voltage.

2. The flexible electroluminescent capacitive sensor system of claim 1, wherein the first, second, and third voltages have a difference of at least 0.1 volts.

3. The flexible electroluminescent capacitive sensor system of claim 1, wherein the electroluminescence electronic drive delivers electricity to the phosphor layer in response to the capacitance meter.

4. The flexible electroluminescent capacitive sensor system of claim 1, wherein the second electrode layer comprises at least two individually electrically addressed detectors and traces and wherein the capacitive meter is attached to each trace.

5. The flexible electroluminescent capacitive sensor system of claim 4, wherein the first transparent electrode layer is patterned such that it is in registration with the detectors in the second electrode layer.

6. The flexible electroluminescent capacitive sensor system of claim 1, wherein the first transparent electrode layer comprises at least two individually electrically addressed detectors and traces and wherein the capacitive meter is attached to each trace.

7. The flexible electroluminescent capacitive sensor system of claim 6, wherein the second electrode layer is patterned such that it is in registration with the detectors in the first transparent electrode layer.

8. The flexible electroluminescent capacitive sensor system of claim 1, wherein the capacitance meter monitors the capacitance change between the second electrode and the conductive reference layer.

9. The flexible electroluminescent capacitive sensor system of claim 1, wherein the capacitance meter monitors the capacitance change between the first transparent electrode and the conductive reference layer.

10. The flexible electroluminescent capacitive sensor system of claim 1, wherein the dielectric layer comprises a film essentially free of voids having a thickness of between 8 and 250 micrometers.

11. The flexible electroluminescent capacitive sensor system of claim 1, wherein the first flexible, resilient dielectric layer comprises a foam.

12. The flexible electroluminescent capacitive sensor system of claim 1, wherein the first dielectric layer is a spacer fabric.

13. The flexible electroluminescent capacitive sensor system of claim 1, wherein the first dielectric layer has a thickness of between 1 and 10 millimeters.

14. The flexible electroluminescent capacitive sensor system of claim 1, wherein the dielectric layer compresses by 50% when a load of between 0.1 and 10 bars is applied.

* * * * *